United States Patent
Jesse

(10) Patent No.: US 7,520,060 B2
(45) Date of Patent: Apr. 21, 2009

(54) TRIMMING DEVICE WITH A REEL PROTECTOR

(75) Inventor: Mark Jesse, Hamburg (DE)

(73) Assignee: DOLMAR GmbH, Hamburg (DE)

( * ) Notice: Subject to any disclaimer, the term of this patent is extended or adjusted under 35 U.S.C. 154(b) by 90 days.

(21) Appl. No.: 11/350,377

(22) Filed: Feb. 7, 2006

(65) Prior Publication Data

US 2006/0191395 A1 Aug. 31, 2006

(30) Foreign Application Priority Data

Feb. 25, 2005 (DE) .................. 20 2005 003 252 U

(51) Int. Cl.
*B26B 7/00* (2006.01)
*B26B 9/00* (2006.01)
(52) U.S. Cl. .............................. 30/276; 30/275; 30/347
(58) Field of Classification Search .................. 30/275, 30/276, 347; 15/12.7, 17; 83/482; 56/12.7, 56/17
See application file for complete search history.

(56) References Cited

U.S. PATENT DOCUMENTS

| | | | | |
|---|---|---|---|---|
| 3,877,148 A * | 4/1975 | Huber | ........................... | 30/391 |
| 4,412,382 A * | 11/1983 | White, III | ..................... | 30/276 |
| 4,630,371 A * | 12/1986 | Graham | ........................ | 30/347 |
| 4,856,194 A * | 8/1989 | Lee | ............................. | 30/276 |
| 4,869,055 A * | 9/1989 | Mickelson | ................... | 56/12.7 |
| 5,491,963 A * | 2/1996 | Jerez | .......................... | 56/17.1 |
| 5,661,960 A * | 9/1997 | Smith et al. | ................... | 56/12.7 |
| 5,768,786 A * | 6/1998 | Kane et al. | ..................... | 30/276 |
| 6,389,701 B1 * | 5/2002 | Friedland | ..................... | 30/391 |
| 7,017,272 B2 * | 3/2006 | Grace | ........................ | 30/275.4 |
| 2003/0033718 A1* | 2/2003 | Alliss | ......................... | 30/276 |
| 2003/0140503 A1* | 7/2003 | Jerez | .......................... | 30/276 |
| 2003/0226262 A1* | 12/2003 | Gambert | ..................... | 30/276 |
| 2006/0179663 A1* | 8/2006 | Harris | ........................ | 30/276 |
| 2006/0265882 A1* | 11/2006 | Liu | ............................. | 30/276 |

FOREIGN PATENT DOCUMENTS

DE 44 37 005 C1 1/1996

OTHER PUBLICATIONS

Search Report from German Patent Office, File Reference 20 2005 003 252.2, published Aug. 16, 2007, applicant Dolmar GmbH (4 pgs.).

* cited by examiner

*Primary Examiner*—Ghassem Alie
*Assistant Examiner*—Bharat C Patel
(74) *Attorney, Agent, or Firm*—Kelly Lowry & Kelley LLP

(57) ABSTRACT

The invention pertains to a trimming device with a motor-driven cutting tool that is rotatable about a shaft and with a shell-like reel protector (100), wherein said trimming device can be operated with different cutting tools. In order to achieve a simple adaptation of the reel protector to the respective tool used, the invention proposes that the reel protector (100) includes a first shell (10) that is rigidly connected to the trimming device and a second shell (11) that can be displaced relative to the first shell (10) in the direction (A) of the shaft of the cutting tool.

2 Claims, 3 Drawing Sheets

TRIMMING DEVICE WITH A REEL PROTECTOR

TECHNICAL FIELD

The invention pertains to a trimming device with a motor-driven cutting tool that is rotatable about a shaft and with a shell-like reel protector.

STATE OF THE ART

A person skilled in the art is familiar with various embodiments of trimming devices that essentially consist of a motor for driving a cutting tool that is rotatably supported on a shaft, preferably an internal combustion engine or possibly an electric motor. The motor is preferably spaced apart from the cutting tool and arranged in a housing with handles that enable a user to take hold of and manipulate the trimming device. A drive shaft extends from the motor to the cutting tool through a shaft tube provided on the housing. If so required, an intermediate gear may be provided on the end of the shaft tube in order to essentially align, for example, the axis of rotation of the cutting tool vertically when the shaft tube is held in an oblique position.

Among other things, saw blades, serrated knives or rotating trimming line cartridges with trimming lines may be considered as cutting tools to be arranged on the end of the shaft. This means that different types of vegetation such as, for example, trees, bushes, grass, etc., can be trimmed and cut with the trimming device. The cutting tool is preferably arranged of the shaft in an exchangeable fashion and fixed relative to the shaft, e.g., with the aid of a screw connection.

In order to preclude any blockage of the trimming device, a reel protector is provided that prevents trimmed vegetation or vegetation to be trimmed from reaching the rotating shaft. For example, this shaft protrudes from a gear housing of the trimming device, wherein a saw blade or a rotating trimming line cartridge with a trimming line is arranged on the end of said shaft. For this purpose, the reel protector is realized in a bell-shaped, dome-shaped or bowl-shaped fashion and surrounds the protruding section of the rotating shaft, wherein the reel protector extends almost to the plane of the rotating cutting tool in order to enable the cutting tool to trim the respective vegetation.

A reel protector of this type is known from DE 196 12 092 A1, wherein this reel protector is detachably clamped between a pressure plate and a reel disk and protrudes downward over the circumferential region of a trimming line cartridge screwed onto the rotating shaft. The disadvantage of this reel protector can be seen in that it only provides sufficient protection for a certain type of trimming line cartridge because the vegetation being trimmed can still reach the rotating shaft if a different trimming line cartridge is used.

DE 44 37 005 C1 describes a reel protecting device for motorized trimmers with a trimming line head, in which an annular surface that is arranged slightly above the rotating trimming line viewed in the axial direction serves as the reel protector. A replacement of the rotating trimming line with another cutting tool is not disclosed in this publication.

The disadvantage of known trimming devices with a reel protector can be seen in that the shell-shaped reel protector is either rigidly arranged on the housing, for example, a gear housing, or integrated into the housing. Since it should be possible to utilize the trimming device with different cutting tools that may also have a different thickness, it is either required to perform a time-consuming exchange of the reel protector, i.e., to screw on an appropriate reel protector, or the existing reel protector needs to be moved into the desired position by inserting additional spacers into the screw connection.

DESCRIPTION OF THE INVENTION, OBJECTIVE, SOLUTION, ADVANTAGES

Based on this state of the art, the invention aims to disclose a trimming device with a reel protector that can be operated with different cutting tools, wherein the reel protector can be easily adapted to the respective cutting tool used.

The central idea of the invention is that the reel protector is composed of several parts. A first shell of the reel protector preferably is also realized in a bell-shaped, dome-shaped or bowl-shaped fashion and rigidly connected to the trimming device such that it covers at least part of the free space situated around the rotatable shaft for the cutting tool that protrudes from the trimming device or a gear housing, respectively. The reel protector also comprises a second shell that can be displaced relative to the first shell or the trimming device, respectively, in the direction of the shaft of the trimming device. In this respect, it is quite obvious to a person skilled in the art that it must be possible to lock this second shell in the respective position adjusted by the user in order to ensure that the reel is optimally protected in this position. The second shell, in essence, is also realized in a bell-shaped, dome-shaped or bowl-shaped fashion and basically covers the entire space situated around the protruding section of the rotatable shaft for the cutting tool.

According to the invention, the mechanism for displacing the second shell relative to the first shell may be designed arbitrarily by a person skilled in the art. For example, it is possible to arrange one or more gear racks on the first shell such that they are able to corporate with rotatable gear wheels on the second shell in order to cause the axial displacement thereof. A person skilled in the art is familiar with a suitable device for locking the gear wheel in the desired position relative to the gear rack. However, this displacement is preferably realized as described below.

After the user of the trimming device has installed the desired cutting tool on the rotatable shaft, the reel protector is adjusted to a short distance of, for example, 1 to 2 mm. This means that the lower edge of the second bowl-shaped shell is spaced apart from the plane of the rotatable cutting tool of the trimming device by one to two millimeters viewed in the axial direction such that the cutting tool is still able to cut the respective vegetation.

It is quite obvious to a person skilled in the art that the reel protector should consist of metal and/or plastic and be realized, for example, in the form of two metal shells in order to achieve a sufficient resistance to wear when the trimming device is subjected to high stresses. Suitable cutting tools to be arranged on the rotatable shaft of the trimming device preferably consist of saw blades, knives with multiple serrations on their outer circumference or trimming lines.

The advantage of the invention can be seen in that the reel protector can be easily adapted to different cutting tools used in connection with the trimming device because the second shell that forms the actual reel protector can be displaced relative to the shaft of the cutting tool in the axial direction.

Advantageous embodiments of the invention are characterized in the dependent claims.

In one advantageous embodiment, the second shell can be subjected to a spring force. In this case, a spring arranged between the first shell and the second shell engages on the first shell that is rigidly connected to the trimming device with one end and on the second shell with the other end. Consequently, this spring exerts a force of pressure upon the second shell in order to always hold this shell in the position desired by the user. In this respect, it is preferred to utilize an annular coil spring such that the force exerted upon the second shell is uniformly distributed over the circumference thereof. The spring ensures that, viewed in the axial direction, the second shell is always pressed away from the plane of the rotating cutting tool toward the trimming device such that the spacing between the lower edge of the second shell and this plane always remains at least equal to that adjusted by the user.

It is advantageous to provide interlocking means for locking the second shell in the desired position relative to the first shell. A person skilled in the art may utilize arbitrary means for holding the second shell in the position desired by the user, for example, by means of a positive fit.

In one preferred embodiment, these interlocking means comprise recesses that are arranged on the wall of the first shell and cooperate with a projection that protrudes inward from the second shell viewed in the radial direction. In this case, the recesses are realized, in particular, in a step-like or stair-like fashion and equidistantly spaced apart in the axial direction. In addition, the second shell is provided with a stopping surface in the form of an annular peripheral shoulder, on which the above-described spring is supported. Analogously, the first shell is provided with a continuous peripheral shoulder, on which the spring is supported. The spring holds the projection arranged on the second shell in the recess adjusted by the user. If so required, the recesses may be realized deeper so as to prevent the projection from shifting to a different recess when the second shell is slightly turned. In order to prevent the second shell from tilting relative to the first shell, the second shell is provided with two projections that lie opposite of one another and cooperate with correspondingly arranged recesses on the first shell. These recesses make it possible to adjust the height or the spacing of the lower edge of the second shell relative to the rotating cutting tool. The difference in height between adjacent recesses preferably does not exceed one millimeter. The user of the trimming device initially installs the desired cutting tool and then adjusts the optimal distance of the second shell from this tool by turning the second shell relative to the first shell until the projections engage into the desired recesses. The force of pressure exerted by the spring needs to be overcome in this case. As soon as the lower edge of the second shell comes in contact with the cutting tool, it is no longer possible to additionally turn the second shell in this direction such that the projections return into the previous recess and the optimal distance is adjusted.

BEST WAY FOR REALIZING THE INVENTION

Figure 1:
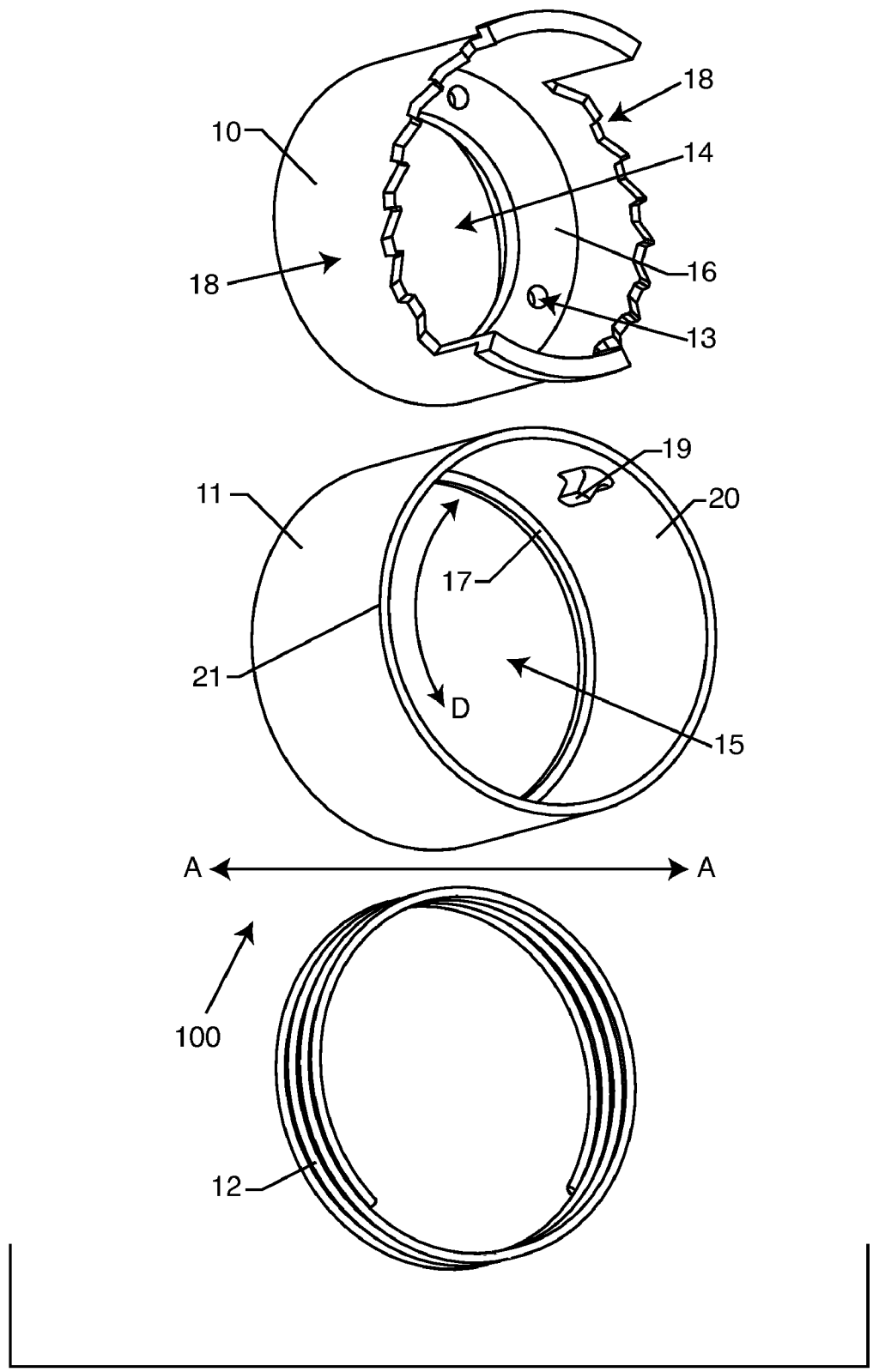
FIG. 1 shows three components of the reel protector in the form of a schematic representation.
Figure 2:
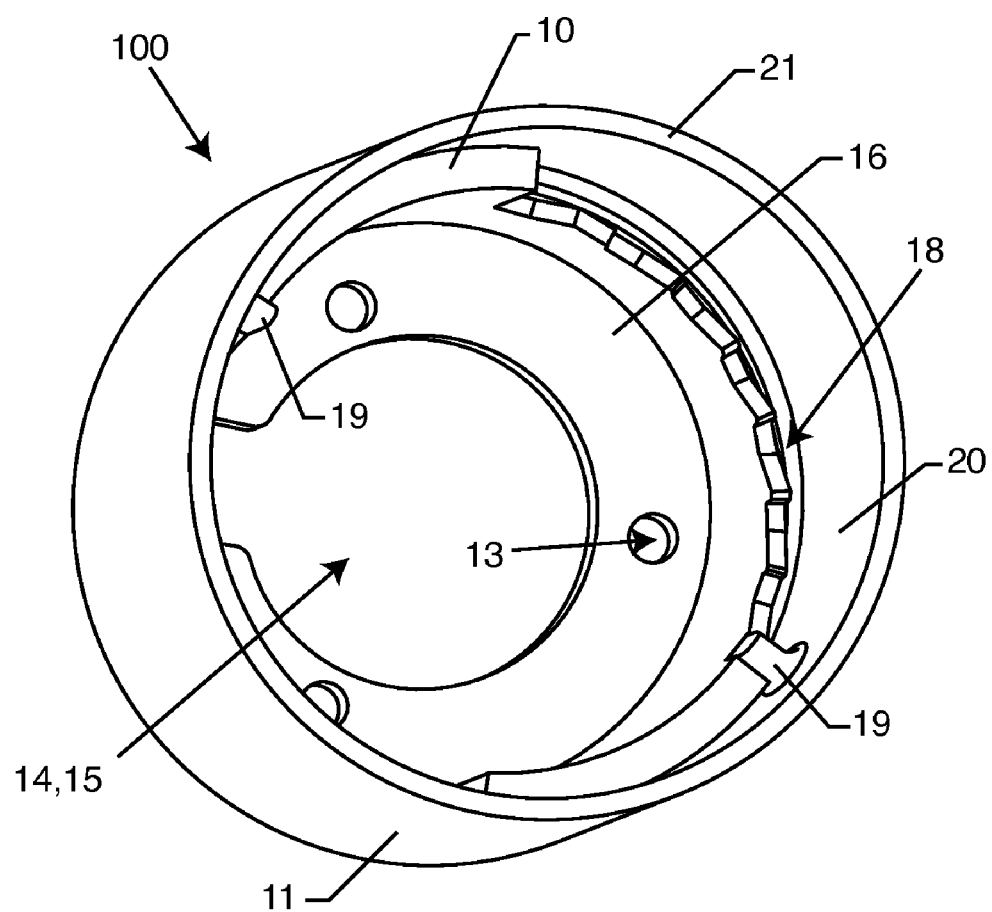
FIG. 2 shows an oblique bottom view of the assembled reel protector.
Figure 3:
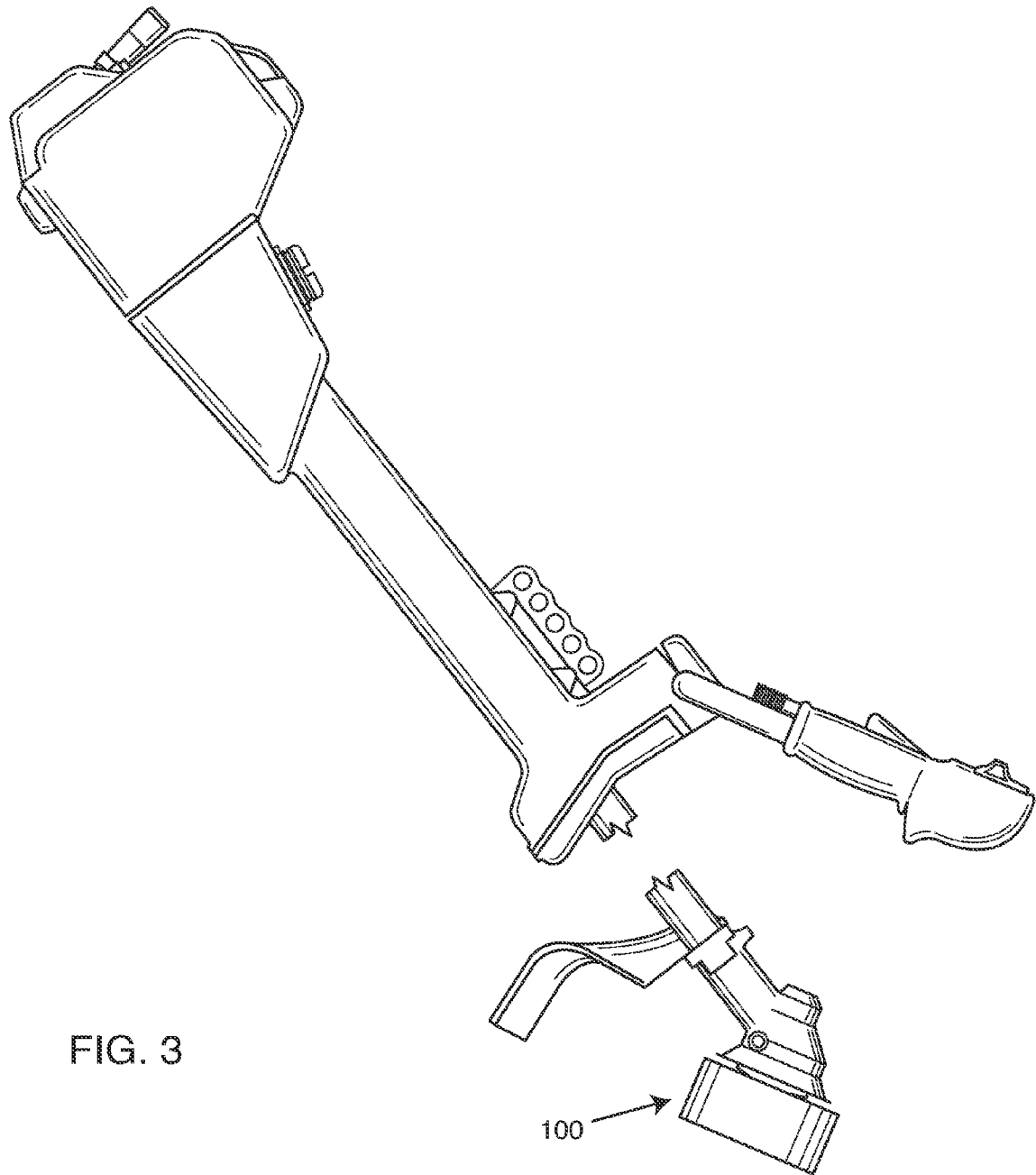
FIG. 3 shows the reel protector of the present invention attached to a prior art trimming device such as that shown in Patent DE 196 12 092 A1.

The embodiment shown in FIGS. 1 and 2 pertains to a reel protector 100 for a trimming device that is not illustrated in these two figures in order to simplify the drawings. FIG. 3 shows the reel protector 100 attached to the trimming device of DE 196 12 092 A1. The reel protector 100 essentially consists of a first shell 10 and a second shell 11 that respectively consist of metal, as well as a spring 12 of an elastic metal known to a person skilled in the art.

The first shell 10 contains screw holes 13 such that it can be mounted on a gear housing or a motor housing of the trimming device. The rotating shaft for the cutting tool respectively extends through the first shell 10 and the second shell 11. The first shell 10 and the second shell 11 are respectively provided with an opening 14, 15 for this purpose.

On the left side in FIG. 1, a continuous peripheral shoulder 17 that essentially protrudes radially inward preferably is integrally formed onto the upper side of the second shell 11. A spring 12, e.g., a coil spring, adjoins this shoulder in order to exert a force of pressure upon the second shell 11 in the axial direction A as indicated by a double arrow, i.e., parallel to the axis of rotation of the cutting tool. In the assembled state of the reel protector 100 shown in FIG. 2, the spring 12 adjoins another continuous shoulder 16 that is peripherally formed onto the first shell 10.

Interlocking means are provided in order to axially displace and lock the second shell 11 in the desired position relative to the first shell 10. These interlocking means comprise recesses 18 that are oppositely arranged in the wall of the first shell 10. These recesses cooperate with projections 19 that preferably are integrally formed onto the inner wall 20 of the second shell 11 such that they essentially protrude radially inward. When the second shell 11 is turned relative to the stationary first shell 10 as indicated by the double arrow D, the projections 19 are respectively displaced from a recess 18 to an adjacent recess 18. Since these recesses are respectively spaced apart from one another by one to two millimeters in the axial direction A, the position of the second shell 11 changes relative to the first shell 10.

Once the user of the trimming device has installed another cutting tool on the end of the rotatable shaft, for example, a saw blade, a knife with serrations on its outer circumference or a trimming line cartridge, the optimal distance of the reel protector 100 relative to the plane of the rotating cutting tool is subsequently adjusted. For this purpose, the user turns the second shell 11 relative to the first shell 10 until the desired maximum spacing between the lower edge 21 of the second shell 11 and the cutting tool is reached. If the user would now attempt to additionally turn the second shell 11 in this direction, the lower edge 21 would come in contact with the cutting tool on the right side in FIG. 1 and the second shell 11 would return into the previous interlocking position.

The invention claimed is:

1. A reel protector for a trimming device, a motor driven cutting tool for trimming and cutting different types of vegetation, whereby the tool is rotatable about a shaft, comprising:
   a reel shell-protector adaptable to the cutting tool, the shell-protector having a first shell that is rigidly connected to the trimming device and a second shell that can be axially displaced relative to the first shell in the direction of the shaft, parallel to the axis of rotation of the cutting tool;
   a spring arranged between the first shell and the second shell;
   interlocking means provided for locking the second shell in different positions relative to the plane of the cutting tool;
   wherein the spring comprises an annular coil spring such that the force exerted upon the second shell is uniformly distributed over the circumference thereof; and wherein the interlocking means comprises recesses that are arranged on the wall of the first shell and which cooperate with projections that protrude inward from the second shell and are integrally formed onto the inner wall of the second shell such that they protrude radially inward; and wherein the second shell is provided with a stopping surface in the form of an annular peripheral shoulder, on which the spring is supported and the first shell is provided with a continuous peripheral shoulder, on which the spring is supported.

2. The reel protector for a trimming device according to claim 1, characterized in that the interlocking means are a screw or a pin.

* * * * *